United States Patent
Fan et al.

(10) Patent No.: US 12,204,613 B2
(45) Date of Patent: Jan. 21, 2025

(54) CLASSIFICATION ALGORITHM BASED ON MULTIFORM SEPARATION

(71) Applicant: Ko-Hui Michael Fan, Taipei (TW)

(72) Inventors: Ko-Hui Michael Fan, Taipei (TW); Chih-Chung Chang, Taipei (TW); Kuang-Hsiao-Yin Kongguoluo, Taipei (TW); Ye-Hwa Chen, Taipei (TW)

(73) Assignee: Ko-Hui Michael Fan, Taipei (TW)

( * ) Notice: Subject to any disclaimer, the term of this patent is extended or adjusted under 35 U.S.C. 154(b) by 1045 days.

(21) Appl. No.: 17/148,860

(22) Filed: Jan. 14, 2021

(65) Prior Publication Data

US 2022/0222494 A1 Jul. 14, 2022

(51) Int. Cl.
| | |
|---|---|
| G06F 18/241 | (2023.01) |
| G06F 17/10 | (2006.01) |
| G06F 18/21 | (2023.01) |
| G06N 20/00 | (2019.01) |

(52) U.S. Cl.
CPC ......... *G06F 18/241* (2023.01); *G06F 17/10* (2013.01); *G06F 18/217* (2023.01); *G06N 20/00* (2019.01)

(58) Field of Classification Search
CPC ...... G06F 18/241; G06F 17/10; G06F 18/217; G06N 20/00
See application file for complete search history.

(56) References Cited

U.S. PATENT DOCUMENTS

2019/0102701 A1* 4/2019 Singaraju .............. G10L 15/063
2021/0133565 A1* 5/2021 Shamir .................... G06N 3/04

OTHER PUBLICATIONS

Zhang et al Linearized Proximal Alternating Direction Method of Multipliers for Parallel Magnetic Resonance Imaging, published in IEEE/CAA Journal of Automatica Sinica, vol. 4, No. 4, Oct. 2017 (Year: 2017).*

* cited by examiner

*Primary Examiner* — Sanchita Roy
(74) *Attorney, Agent, or Firm* — MUNCY, GEISSLER, OLDS & LOWE, P.C.

(57) ABSTRACT

The present invention provides a multiform separation classifier, including an input module, a data collection module, a multiform separation engine, and an output module. The input module is configured to receive sample data. The data collection module is connected to the input module and configured to store a collection of data from the input module. The collection of data includes a training set and/or a test set. The multiform separation engine is connected to the data collection module and configured to use at least two piecewise continuous functions to perform classification. The piecewise continuous functions are respectively trained with the training set through a learning process. The output module is connected to the multiform separation engine and configured to derive an output result after the sample data is processed through the multiform separation engine.

15 Claims, 4 Drawing Sheets

CLASSIFICATION ALGORITHM BASED ON MULTIFORM SEPARATION

BACKGROUND OF THE INVENTION

1. Field of the Invention

The present invention relates to machine learning of artificial intelligence (AI) and, more particularly, to a classification algorithm based on multiform separation, in particular, on quadratic multiform separation.

2. Description of Related Art

As is well known, machine learning builds a hypothetical model based on sample data for a computer to make a prediction or a decision. The hypothetical model may be implemented as a classifier, which approximates a mapping function from input variables to output variables. The goal of machine learning is to make the hypothetical model as close as possible to a target function which always gives correct answers. This goal may be achieved by training the hypothetical model with more sample data.

Machine learning approaches are commonly divided into three categories: supervised learning, unsupervised learning, and reinforcement learning. Various models have been developed for machine learning, such as convolutional neural network (CNN), recurrent neural network (RNN), long short-term memory (LSTM) network, YOLO, ResNet, ResNet-18, ResNet-34, Vgg16, GoogleNet, Lenet, MobileNet, decision trees, and support vector machine (SVM).

Figure 1:
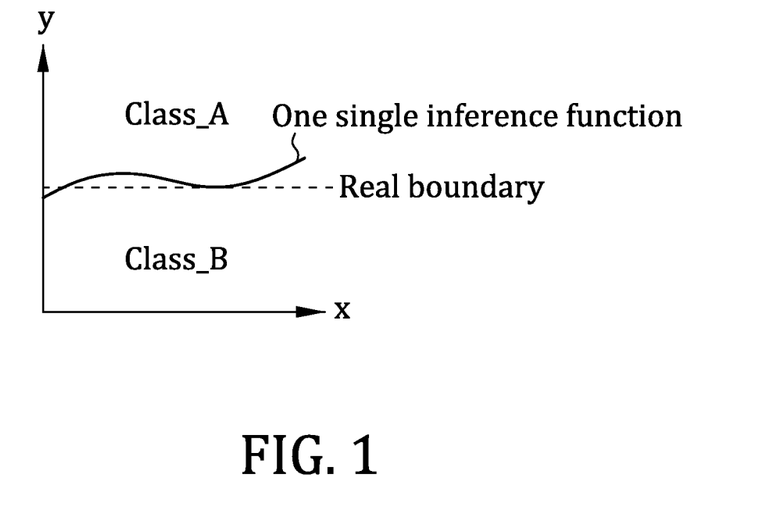
FIG. 1 shows a schematic diagram of classification accomplished by one single inference function of a prior art classifier.

In the traditional approach, a classifier is applied with only a single model having one single inference function to accomplish the job of classification. It may solve a simple classification problem as shown in FIG. 1.

Figure 2:
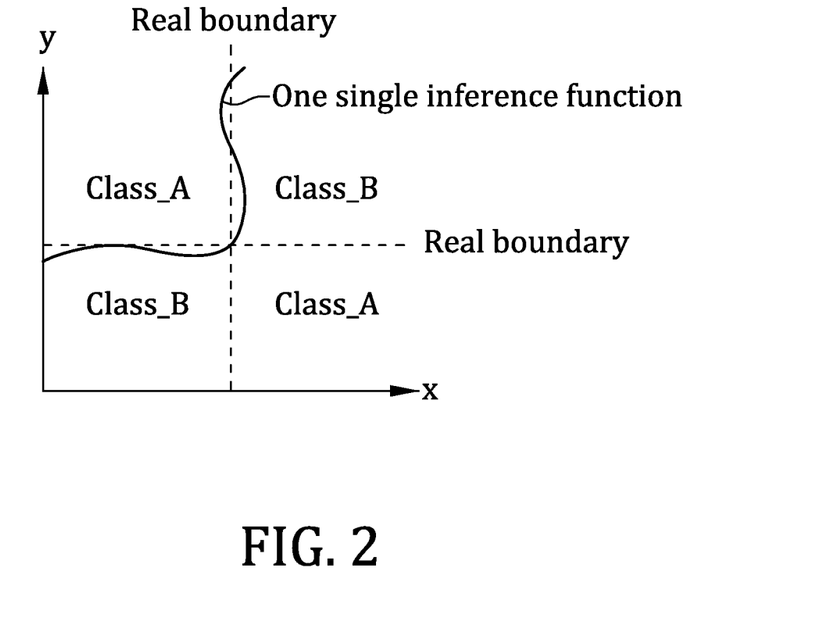
FIG. 2 shows a problem that the prior art classifier may face.

However, in some cases, it is very difficult and even impossible to use one single inference function to distinguish the characteristics among elements, and put the elements into different classes. FIG. 2 shows a more complicated problem. When Class_A and Class_B have a checkerboard pattern, one single inference function can hardly fit the boundaries of the pattern, and a proper classification is unlikely to be done.

Also, every model has its own advantages and drawbacks, in terms of accuracy, robustness, complexity, speed, dependency, cost, and so on; when a model focuses on some points, it may possibly neglect the others, and therefore an extreme bias may occur.

Therefore, it is desirable to provide an improved classifier to mitigate and/or obviate the aforementioned problems.

SUMMARY OF THE INVENTION

The present invention proposes a classification algorithm (or paradigm) in supervised machine learning. It is based on a revolutionary concept, which is called "multiform separation" (MS), on separating sets in Euclidean space. Next, an ingenious method is presented to carry out the multiform separation. This method may be regarded as the core of the present invention.

Further, a particular embodiment uses "quadratic multiform separation" (QMS) to realize the present invention. In such embodiment, quadratic functions are utilized to build the cost function of which the minimizers can generate the solution of the classification problem.

The classification algorithm of the present invention may be implemented into a cloud server or a local computer as hardware or software (or computer program) or as separated circuit devices on a set of chips or an integrated circuit device on a single chip.

Before implementing the main steps of the classification algorithm of the present invention, several preliminary steps should be done in advance.

(Preliminary Step P1: Preparing a Training Set)

Let $\Omega \subset \mathbb{R}^p$ be a collection of data (or observations) which is composed of m memberships (or categories) of elements, and the m memberships are digitized as 1, 2, ..., m.

A part of data $\Omega_{tr} \subset \Omega$, typically called a "training set", and another part of data $\Omega_{tt} \subset \Omega$, typically called a "test set", are prepared from the data $\Omega$. The collection of data $\Omega$ may optionally include more parts, such as a remaining set $\Omega_{th}$. It is assumed that the training set $\Omega_{tr}$ and the test set $\Omega_{tt}$ are sufficient large and share the full characteristics represented by the whole collection of data $\Omega$.

(Preliminary Step P2: Setting a Membership Function)

Let $y: \Omega \to S=\{1, 2, \ldots, m\}$ be a membership function (also regarded as a target function) so that $y(x)$ gives precisely the genuine membership of x.

(Preliminary Step P3: Training a Classifier Using the Classification Algorithm of the Present Invention)

The goal of the classification problem is to use the training set $\Omega_{tr}$ to derive a classifier $\hat{y}(\cdot)$ that serves as a good approximation of $y(\cdot)$.

(Preliminary Step P4: Decomposing the Training Set into Subsets)

Clearly, $y(\cdot)$ and $\hat{y}(\cdot)$ produce two decompositions of the training set $\Omega_{tr}$ as disjoint unions of subsets:

$$\Omega_{tr} = \bigcup_{j=1}^{m} \Omega_{tr}(j) = \bigcup_{j=1}^{m} \hat{\Omega}_{tr}(j)$$

where, for j=1, ..., m, $$\Omega_{tr}(j)=\{x \in \Omega_{tr} : y(x)=j\}$$

which is the genuine classification of the elements, and $$\hat{\Omega}_{tr}(j)=\{x \in \Omega_{tr} : \hat{y}(x)=j\}$$

which is the approximate classification of the elements.

Define the cardinalities $n_{tr}=|\Omega_{tr}|$ and $n_{tr}(j)=|\Omega_{tr}(j)|$, where, for a finite set A, the cardinality $|A|$ is the number of elements of A. Since the subsets $\Omega_{tr}(j)$'s are disjoint and the union of them is the training set $\Omega_{tr}$, it is obvious that $n_{tr}=\Sigma_{tr}(j)$.

(Preliminary Step P5: Preparing a Test Set)

In some embodiments, the test set $\Omega_{tt}$ is used to determine the accuracy of $\hat{y}$, where the accuracy may refer to the percentage (%) of x's in $\Omega_{tt}$ such that $\hat{y}(x)=y(x)$, for example.

(General Multiform Separation)

Instead of finding one single inference function to accomplish the job of classification as commonly seen in many prior art methods, the present invention finds that an appropriate utilization of multiple functions can produce better solutions, in terms of accuracy, robustness, complexity, speed, dependency, cost, and so on.

In some cases, it is very difficult and even impossible to use one single inference function to distinguish the characteristics among elements with different memberships. Along this reasoning, the present invention is lead to the utilization of multiform separation.

(Main Step Q1: Generating Piecewise Continuous Functions)

Loosely speaking, a function h: $\mathbb{R}^p \to \mathbb{R}$ is called a piecewise continuous function if there exist finite disjoint subsets $D_1, \ldots, D_w$ such that $D_1 \cup \ldots \cup D_w = \mathbb{R}^p$ and h is continuous on the interior of $D_j$, $j=1, \ldots, w$.

Generate m piecewise continuous functions $f_j$: $\mathbb{R}^p \to \mathbb{R}$, $j=1, \ldots, m$, based on the training set $\Omega_{tr}$. After training, the m piecewise continuous functions $f_1, \ldots, f_m$ can carry important characteristics of the respective training subsets $\Omega_{tr}(j)$'s so that each membership subset $$U(j) = \{x \in \Omega : f_j(x) = \min\{f_1(x), f_2(x), \ldots, f_m(x)\}\}$$

is expected to satisfy $U(j) \cap \Omega_{tr} \approx \Omega_{tr}(j)$ for each $j=1, \ldots, m$.

Herein, the operator min{ } indicates the minimal item of the set. In other embodiments, it is also possible to choose other operators, such as max{ }, which indicates the maximal item of the set, for the aforementioned equation to realize the present invention.

(Main Step Q2: Giving a Classifier by Multiform Separation)

The multiform separation now gives a classifier $\hat{y}$: $\to S$ defined by $$\hat{y}(x) = j \text{ if } x \in U(j)$$

or equivalently, $$\hat{y}(x) = j \text{ if } f_j(x) \leq f_k(x), k=1, \ldots, m$$

In other words, an element $x \in \Omega$ is classified by the classifier $\hat{y}$ to have a membership j if the evaluation at x of $f_j$ is minimal among all the evaluations at x of the m piecewise continuous functions $f_1, \ldots, f_m$.

It is noted that, though the membership subsets $U(j)$'s are not necessarily disjoint, the cases that the same minimum are attained by multiple piecewise continuous functions $f_j$'s are rare. (The outputs of $f_j(x)$'s are real numbers, so it is rare that some of $f_j$'s output the same value.) However, when the case happens, a possible solution is to randomly pick one membership from the involved $f_j(x)$'s.

Hereby, a general MS classifier y of the present invention is provided.

(Quadratic Multiform Separation)

The quadratic multiform separation is a specific embodiment of the general multiform separation as previously discussed. Needless to say, the way to generate the piecewise continuous functions $f_j(\cdot)$'s in the multiform separation is not unique. Any suitable functions may be used therein. However, the piecewise continuous functions $f_j(\cdot)$'s must be generated carefully in order to dig out (or extract) the characteristics hidden in each training subset $\Omega_{tr}(j)$, $j=1, \ldots, m$. According to the present invention, the quadratic multiform separation is one efficient way to generate the piecewise continuous functions $f_j(\cdot)$'s which carry rich and useful information of the training subsets $\Omega_{tr}(j)$'s that can be applied in various applications in addition to solving supervised classification problem.

(Sub-Step Q11: Defining Forms of Member Functions)

Let $q \in \mathbb{N}$ be given. A function f: $\mathbb{R}^p \to \mathbb{R}$ is called a q-dimensional member function if it is of the form $$f(x) = \|Ax - b\|^2$$

for a constant matrix $A \in \mathbb{R}^{q \times p}$ and a constant vector $b \in \mathbb{R}^q$, where $\|\cdot\|$ denotes the Euclidean norm. Clearly, f(x) is a quadratic function of x. As will be discussed later in sub-step Q16, the constant matrices $A_1, \ldots, A_m$ and the constant vectors $b_1, \ldots, b_m$ of the m q-dimensional member functions $f_1(x), \ldots, f_m(x)$ are items to be solved.

(Sub-Step Q12: Creating a Set of Member Functions)

$\Theta(q)$ denotes the set of all q-dimensional member functions, that is, $\Theta(q) = \{\|Ax-b\|^2 : A \in \mathbb{R}^{q \times p}, b \in \mathbb{R}^q\}$. When q is chosen and fixed, $\Theta(q)$ may be written as $\Theta$ for convenience in the following description. The member functions may be regarded as data structures.

(Sub-Step Q13: Generating Member Functions)

Fix an integer q that is sufficiently large. Generate m q-dimensional member functions $f_j$: $\mathbb{R}^p \to \mathbb{R}$, $j=1, \ldots, m$, based on the training sets $\Omega_{tr}$. Following the same approach as previously discussed in general multiform separation, the subsets $U(j) = \{x \in \Omega: f_j(x) = \min\{f_1(x), f_2(x), \ldots, f_m(x)\}\}$, $j=1, \ldots, m$, are derived and the classifier $\hat{y}$: $\Omega \to S$ is defined by $\hat{y}(x) = j$ if $x \in U(j)$.

(Detail-Step Q131: Setting Control Parameters of Learning Process)

Herein, the present invention provides an efficient learning process for generating the member functions in sub-step Q13 so that the intersection of each membership set U(j) and the training set $\Omega_{tr}$ is satisfactorily close to each $\Omega_{tr}(j)$, that is, $U(j) \cap \Omega_{tr} \approx \Omega_{tr}(j)$, $j=1, \ldots, m$.

Fix an integer q and let $\alpha_{jk} \in (0,1)$, $j=1, \ldots, m$, $k=1, \ldots, m$ be control parameters of the learning process. The $m^2$ control parameters $\alpha_{jk}$, $j=1, \ldots, m$, $k=1, \ldots, m$ are not necessarily distinct.

(Detail-Step Q132: Defining Intermediate Functions of Learning Process)

Given m q-dimensional member functions $f_1, \ldots, f_m$ and $m^2$ control parameters $\alpha_{jk}$, $j=1, \ldots, m$, $k=1, \ldots, m$, intermediate functions $\varphi_{jk}$: $\Omega \to \mathbb{R}$, $j=1, \ldots, m$, $k=1, \ldots, m$, are defined by $$\varphi_{jk}(x) = \max\left\{\alpha_{jk}, \frac{f_j(x)}{f_k(x)}\right\}$$

Obviously, $\varphi_{jk}(x) < 1$ if and only if $f_j(x) < f_k(x)$, $j=1, \ldots, m$, $k=1, \ldots, m$, $k \neq j$.

The training process will be more efficient with the introduction of the control parameters.

(Detail-Step Q133: Defining a Cost Function of Learning Process)

The goal of the learning process according to the present invention is to match the property "x has membership j" for $j=1, \ldots, m$, with the algebraic relations $\varphi_{jk}(x) < 1$, $k \in S$, $k \neq j$.

A cost function $\Phi$ is denoted by $$\Phi(f_1, \ldots, f_m) = \sum_{j=1}^{m} \sum_{k \in S, k \neq j} \sum_{x \in \Omega_{tr}(j)} \varphi_{jk}(x)$$

The quantity of the cost function $\Phi$ provides a performance measure for separating the training subsets $\Omega_{tr}(1), \ldots, \Omega_{tr}(m)$ by the given member functions $f_1, \ldots, f_m$. With the integer q, the $m^2$ control parameters $\alpha_{jk}$, $j=1, \ldots, m$, $k=1, \ldots, m$, and the training set $\Omega_{tr}$ given, and q sufficiently large, the cost function $\Phi$ defined above therefore depends only on the constant matrices $A_1, \ldots, A_m$ and the constant vectors $b_1, \ldots, b_m$ that define the member functions $f_1, \ldots, f_m$.

(Detail-Step Q134: Executing Learning Process Based on Cost Function)

The member functions $f_1, \ldots, f_m$ are generated by minimizing the cost function $\Phi$ among $\Theta(q)$, the set of all q-dimensional member functions. Formally, the task of the learning process is to solve $$\min_{f_1,\ldots,f_m} \Phi(f_1, \ldots, f_m) = \min_{f_1,\ldots,f_m} \sum_{j=1}^{m} \sum_{k \in S, k \neq j} \sum_{x \in \Omega_{tr}(j)} \varphi_{jk}(x)$$

The generated member functions $f_1, \ldots, f_m$ are the objectives pursued in sub-step Q13. They are used to construct the classifier $\hat{y}$ of the present invention, which is called a QMS classifier in this embodiment.

Other objects, advantages, and novel features of the invention will become more apparent from the following detailed description when taken in conjunction with the accompanying drawings.

DETAILED DESCRIPTION OF THE EMBODIMENT

Different embodiments of the present invention are provided in the following description. These embodiments are meant to explain the technical content of the present invention, but not meant to limit the scope of the present invention. A feature described in an embodiment may be applied to other embodiments by suitable modification, substitution, combination, or separation.

It should be noted that, in the present specification, when a component is described to have an element, it means that the component may have one or more of the elements, and it does not mean that the component has only one of the element, except otherwise specified.

Moreover, in the present specification, the ordinal numbers, such as "first" or "second", are used to distinguish a plurality of elements having the same name, and it does not means that there is essentially a level, a rank, an executing order, or a manufacturing order among the elements, except otherwise specified. A "first" element and a "second" element may exist together in the same component, or alternatively, they may exist in different components, respectively. The existence of an element described by a greater ordinal number does not essentially mean the existent of another element described by a smaller ordinal number.

Moreover, in the present specification, the terms, such as "preferably" or "advantageously", are used to describe an optional or additional element or feature, and in other words, the element or the feature is not an essential element, and may be ignored in some embodiments.

Moreover, each component may be realized as a single circuit or an integrated circuit in suitable ways, and may include one or more active elements, such as transistors or logic gates, or one or more passive elements, such as resistors, capacitors, or inductors, but not limited thereto. Each component may be connected to each other in suitable ways, for example, by using one or more traces to form series connection or parallel connection, especially to satisfy the requirements of input terminal and output terminal. Furthermore, each component may allow transmitting or receiving input signals or output signals in sequence or in parallel. The aforementioned configurations may be realized depending on practical applications.

Moreover, in the present specification, the terms, such as "system", "apparatus", "device", "module", or "unit", refer to an electronic element, or a digital circuit, an analogous circuit, or other general circuit, composed of a plurality of electronic elements, and there is not essentially a level or a rank among the aforementioned terms, except otherwise specified.

Moreover, in the present specification, two elements may be electrically connected to each other directly or indirectly, except otherwise specified. In an indirect connection, one or more elements may exist between the two elements.

(General Multiform Separation Classifier)

Figure 3:
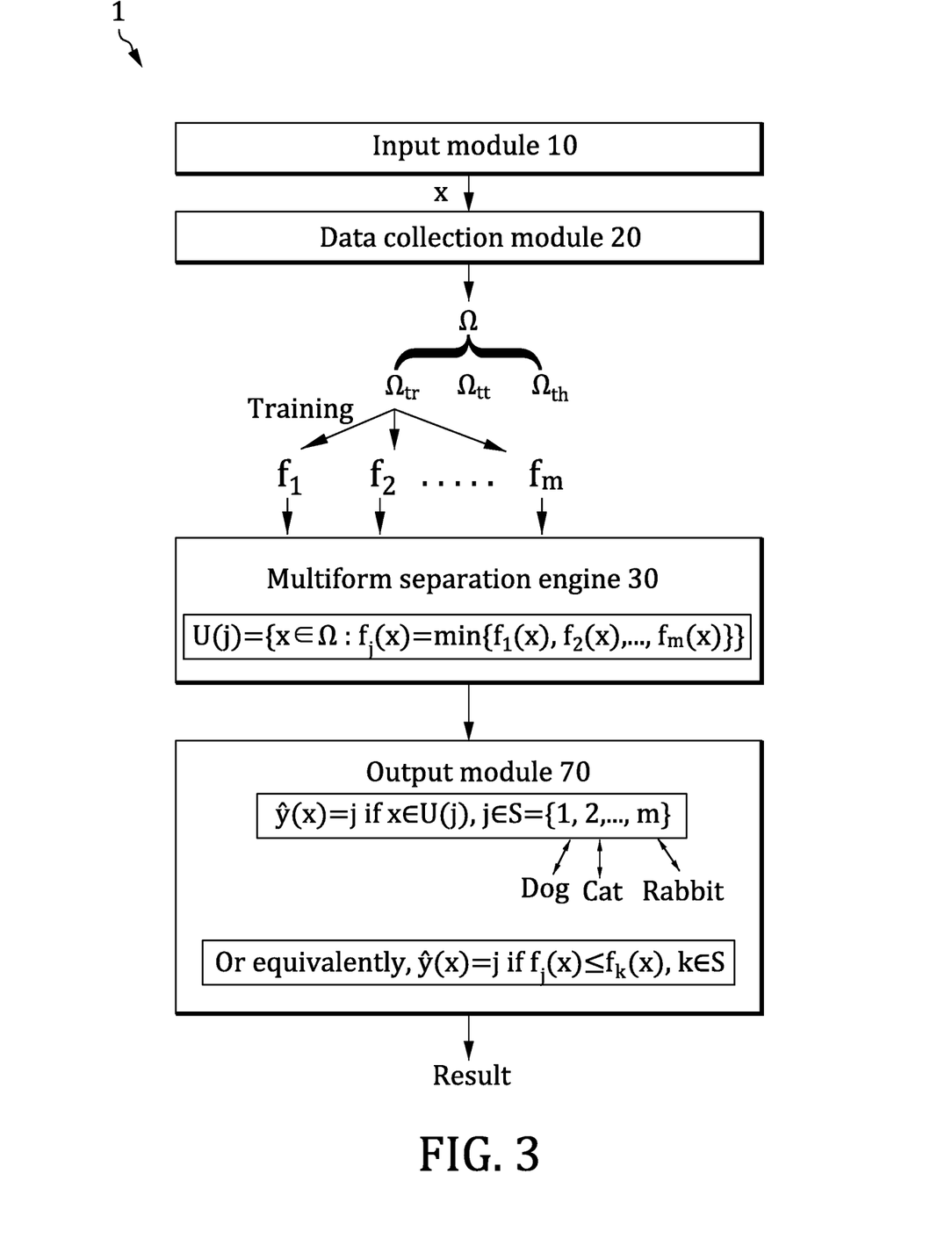
FIG. 3 shows a schematic block diagram of the multiform separation classifier according to one embodiment of the present invention.

FIG. 3 shows a schematic block diagram of the multiform separation classifier 1 according to one embodiment of the present invention.

As shown in FIG. 3, the multiform separation classifier 1 of the present invention, provided in the context of machine learning, includes an input module 10, a data collection module 20, a multiform separation engine 30, and an output module 70.

It can be understood that the modules or engines are illustrated here for the purpose of explaining the present invention, and the modules or engines may be integrated or separated into other forms as hardware or software in separated circuit devices on a set of chips or an integrated circuit device on a single chip. The multiform separation classifier 1 may be implemented in a cloud server or a local computer.

The input module 10 is configured to receive sample data (or an element) x. The input module 10 may be a sensor, a camera, a speaker, and so on, that can detect physical phenomena, or it may be a data receiver.

The data collection module 20 is connected to the input module 10 and configured to store a collection of data 51, from the input module 10. The collection of data $\Omega \subset \mathbb{R}^p$ includes a training set $\Omega_{tr}$ and/or a test set $\Omega_{tt}$ and/or a remaining set $\Omega_{th}$. Here $\mathbb{R}$ is the set of real numbers and the expression $\Omega \subset \mathbb{R}^p$ means that the collection of data $\Omega$ belongs to $\mathbb{R}^p$, the space of p-dimensional real vectors. The collection of data $\Omega$ may also be regarded as a data structure.

With supervised approach, a membership function y: $\Omega \to S = \{1, 2, \ldots, m\}$ can be found so that y(x) gives precisely the membership of the input data x. Accordingly, the collection of data 12 is composed of m memberships (or data categories), and the m memberships are digitized as 1, 2, ..., m. To specifically explain the meaning of the data categories, for example, when a classifier is used to recognize animal pictures, membership "1" may indicate "dog", membership "2" may indicate "cat", . . . , and membership "m" may indicate "rabbit". Herein, "dog", "cat", and "rabbit" are regarded as the data categories. For another example, when a classifier is used to recognize people's age by their faces, membership "1" may indicate "child", membership "2" may indicate "teenage", . . . , and membership "m" may indicate "adult". Herein, "child", "teenage", and "adult" are regarded as the data categories.

The multiform separation engine 30 is connected to the data collection module 20 and configured to use m piecewise continuous functions $f_1, f_2, \ldots, f_m$ to perform classification. The m piecewise continuous functions $f_1, f_2, \ldots, f_m$ typically handle the same type of data, for example, they all handle image files for image recognition, all handle audio files for sound recognition, and so on, so that they can work consistently.

The classification involves two stages (or modes): a training (or learning) stage and a prediction (or decision) stage.

Loosely speaking, a function h: $\mathbb{R}^p \to \mathbb{R}$ is called a piecewise continuous function if there exist finite disjoint subsets $D_1, \ldots, D_w$ such that $D_1 \cup \ldots \cup D_w = \mathbb{R}^p$, and f is continuous on the interior of $D_j$, $j=1, \ldots, w$.

In the training stage, m piecewise continuous functions $f_j$: $\mathbb{R}^p \to \mathbb{R}$, $j=1, \ldots, m$, are generated based on the training set $\Omega_{tr}$ through a learning process. After training, the m piecewise continuous functions $f_1, \ldots, f_m$ can carry important characteristics of the respective training subsets $\Omega_{tr}(j)$'s so that each membership subset $$U(j) = \{x \in \Omega : f_j(x) = \min\{f_1(x), f_2(x), \ldots, f_m(x)\}\}$$

is expected to satisfy $U(j) \cap \Omega_{tr} \approx \Omega_{tr}(j)$ for each $j=1, \ldots, m$. That is, the present invention aims to obtain each membership subset U(j), which should ideally coincide with the collection of data in $\Omega$ having membership j. Consequently, $U(j) \cap \Omega_{tr}$ should be approximately the same as $\Omega_{tr}(j)$.

Herein, the operator min{ } indicates the minimal item of the set. In other embodiments, it is also possible to choose other operators, such as max{ }, which indicates the maximal element of the set, for the aforementioned equation to realize the present invention.

In brief, according to the present invention, the multiform separation engine 30 is configured to derive temporary evaluations $f_j(x), \ldots, f_m(x)$ for certain sample data x from the m trained piecewise continuous functions $f_1, \ldots, f_m$. Then, the sample data x is assigned to have a membership j if $f_j(x)$ is the minimal among $f_1(x), \ldots, f_m(x)$. This process is applied to every sample data x to generate membership subsets $U(1), \ldots, U(m)$.

The output module 70 is directly or indirectly connected to the multiform separation engine 30, and configured to derive an output result after the sample data x is processed through the multiform separation engine 30. The output result may be directly the membership j, or be further converted to the data category, such as "dog", "cat", or "rabbit" indicated by the membership j.

If the output module 70 directly outputs the membership j, the multiform separation classifier 1 of the present invention can be expressed by $$\hat{y}(x) = j \text{ if } x \in U(j)$$

or equivalently, $$\hat{y}(x) = j \text{ if } f_j(x) \leq f_k(x), k=1, \ldots, m$$

In other words, the sample data $x \in \Omega$ is classified by the multiform separation classifier 1, denoted by $\hat{y}$, to have a membership j if a temporary evaluation $f_j(x)$ at the sample data x of a certain trained piecewise continuous function $f_j$ is minimal among all temporary evaluations $f_1(x), \ldots, f_m(x)$ at the sample data x of the m trained piecewise continuous functions $f_1, \ldots, f_m$.

In rare cases, multiple trained piecewise continuous functions may attain the same minimum, and in such cases, a possible solution is to randomly pick one of the memberships indicated by the multiple trained piecewise continuous functions.

(Quadratic Multiform Separation Classifier)

Figure 4:
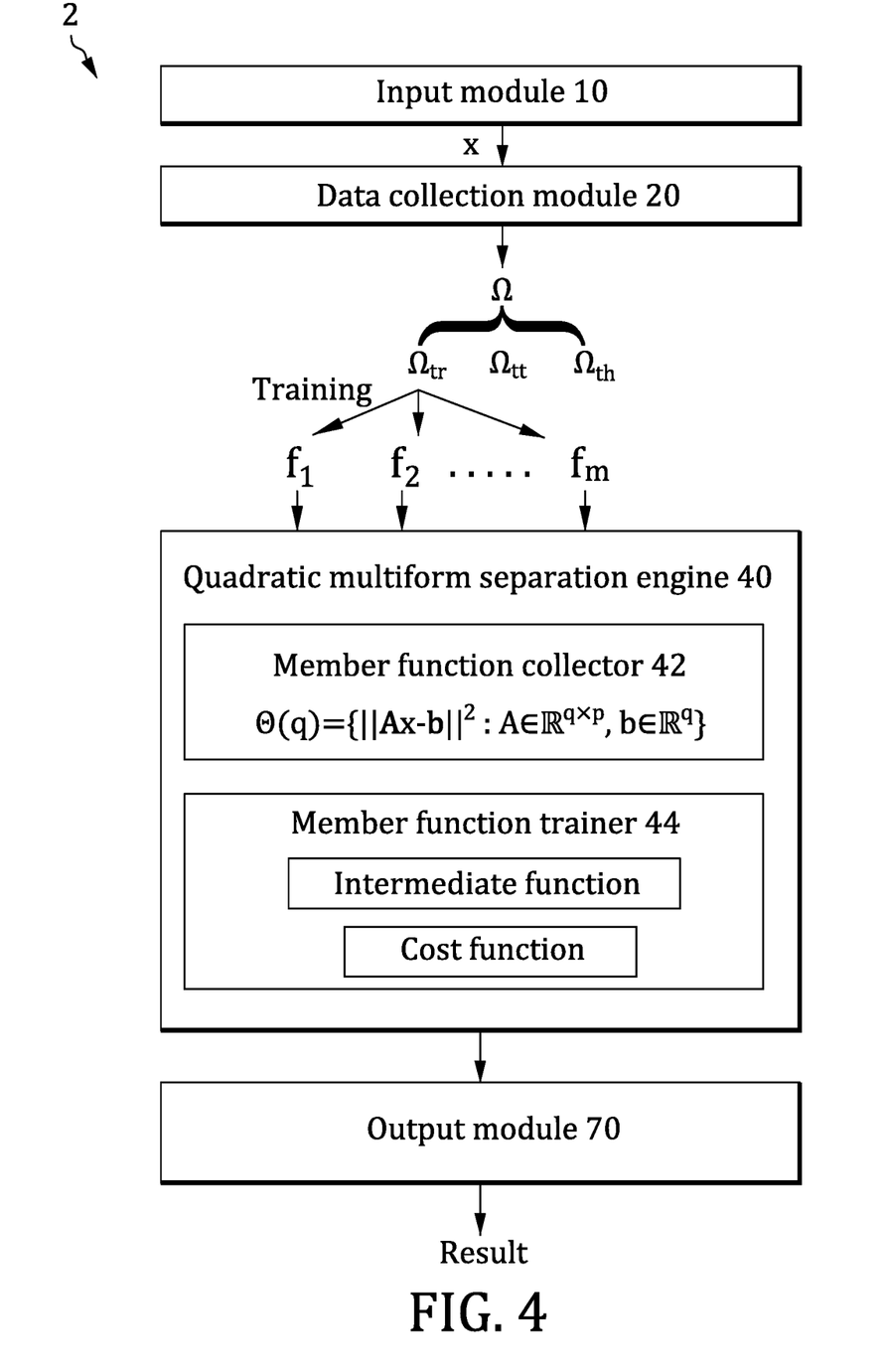
FIG. 4 shows a schematic block diagram of the multiform separation classifier according to another embodiment of the present invention.

FIG. 4 shows a schematic block diagram of the multiform separation classifier 2 according to another embodiment of the present invention.

As shown in FIG. 4, the quadratic multiform separation classifier 2 has the same structure as in the multiform separation classifier 1 of FIG. 3, but its multiform separation engine 30 evolves into a quadratic multiform separation engine 40. The quadratic multiform separation engine 40 includes a member function collector 42 and a member function trainer 44.

In this embodiment, each piecewise continuous function $f_j(x)$ is set to be a quadratic function of the sample data x. In particular, let $q \in \mathbb{N}$ be given, where $\mathbb{N}$ represents the set of natural numbers. A function f: $\mathbb{R}^p \to \mathbb{R}$ is called a q-dimensional member function if it is of the form $$f(x) = \|Ax - b\|^2$$

for a constant matrix $A \in \mathbb{R}^{q \times p}$ and a constant vector $b \in \mathbb{R}^q$, where $\|\cdot\|$ denotes the Euclidean norm. In particular, $$A = \begin{pmatrix} a_{11} & \cdots & a_{1p} \\ \vdots & \ddots & \vdots \\ a_{q1} & \cdots & a_{qp} \end{pmatrix}$$

$$x = \begin{pmatrix} x_1 \\ \vdots \\ x_p \end{pmatrix}$$

$$b = \begin{pmatrix} b_1 \\ \vdots \\ b_q \end{pmatrix}$$

Fix an integer q that is sufficiently large. Generate m q-dimensional member functions $f_j$: $\mathbb{R}^p \to \mathbb{R}$, $j=1, \ldots, m$, based on the training sets $\Omega_{tr}$. As will be discussed later, the constant matrices $A_1, \ldots, A_m$ and the constant vectors $b_1, \ldots, b_m$ of the m q-dimensional member functions are items to be solved.

Accordingly, the member function collector 42 of the quadratic multiform separation engine 40 is configured to store a set of member functions, denoted by $\Theta(q)$. That is, $\Theta(q) = \{\|Ax - b\|^2$: constant matrix $A \in \mathbb{R}^{q \times p}$, constant vector $b \in \mathbb{R}^q\}$.

The member function trainer 44 of the quadratic multiform separation engine 40 is configured to perform the learning process.

Herein, the present invention provides an efficient learning process for generating the member functions so that the intersection of each membership set U(j) and the training set $\Omega_{tr}$ is satisfactorily close to respective $\Omega_{tr}(j)$, that is, $U(j) \cap \Omega_{tr} \approx \Omega_{tr}(j)$, $j=1, \ldots, m$.

According to the present invention, in the learning process, $m^2$ control parameters $\alpha_{jk}$, $j=1, \ldots, m$, $k=1, \ldots, m$ are set to participate comparisons among the m member functions, and the comparisons are performed according to a specific operator. Preferably, the $m^2$ control parameters $\alpha_{jk}$, $j=1, \ldots, m$, $k=1, \ldots, m$ are set between 0 and 1, and they are not necessarily distinct.

With the m q-dimensional member functions $f_1, \ldots, f_m$, and the $m^2$ control parameters $\alpha_{jk}$, $j=1, \ldots, m$, $k=1, \ldots, m$, intermediate functions $\varphi_{jk}: \Omega \to \mathbb{R}$, $j=1, \ldots, m$, $k=1, \ldots, m$, are defined by $$\varphi_{jk}(x) = \max\left\{\alpha_{jk}, \frac{f_j(x)}{f_k(x)}\right\}$$

Obviously, $\varphi_{jk}(x)<1$ if and only if $f_j(x)<f_k(x)$, $j \in S$, $k \in S$, $k \neq j$. It is noted that $S=\{1, 2, \ldots, m\}$ is the set of memberships.

The training process will be more efficient with the introduction of the control parameters.

It is to be understood that the goal of the learning process according to the present invention is to match the property "x has membership j" for $j=1, \ldots, m$, with the algebraic relations $\varphi_{jk}(x)<1$, $k \in S$, $k \neq j$.

In order to reach the goal, a so-called cost function t is introduced and denoted by $$\Phi(f_1, \ldots, f_m) = \sum_{j=1}^{m} \sum_{k \in S, k \neq j} \sum_{x \in \Omega_{tr}(j)} \varphi_{jk}(x)$$

The quantity of the cost function $\Phi$ provides a performance measure for separating the training subsets $\Omega_{tr}(1), \ldots, \Omega_{tr}(m)$, by the given member functions $f_1, \ldots, f_m$. With the integer q, the $m^2$ control parameters $\alpha_{jk}$, $j=1, \ldots, m$, $k=1, \ldots, m$, and the training set $\Omega_{tr}$ given, and q sufficiently large, the cost function $\Phi$ defined above therefore depends only on the constant matrices $A_1, \ldots, A_m$ and the constant vectors $b_1, \ldots, b_m$ that define the member functions $f_1, \ldots, f_m$.

The member functions $f_1, \ldots, f_m$ are generated by minimizing the cost function $\Phi$ among $\Theta(q)$, the set of all q-dimensional member functions. Formally, the task of the learning process is to solve $$\min_{f_1, \ldots, f_m} \Phi(f_1, \ldots, f_m) = \min_{f_1, \ldots, f_m} \sum_{j=1}^{m} \sum_{k \in S, k \neq j} \sum_{x \in \Omega_{tr}(j)} \varphi_{jk}(x)$$

The generated member functions $f_1, \ldots, f_m$ are the objectives pursued in the learning process performed by the member function trainer 44. They are used to construct the quadratic multiform separation classifier 2, denoted by ŷ, of the present invention.

Figure 5:
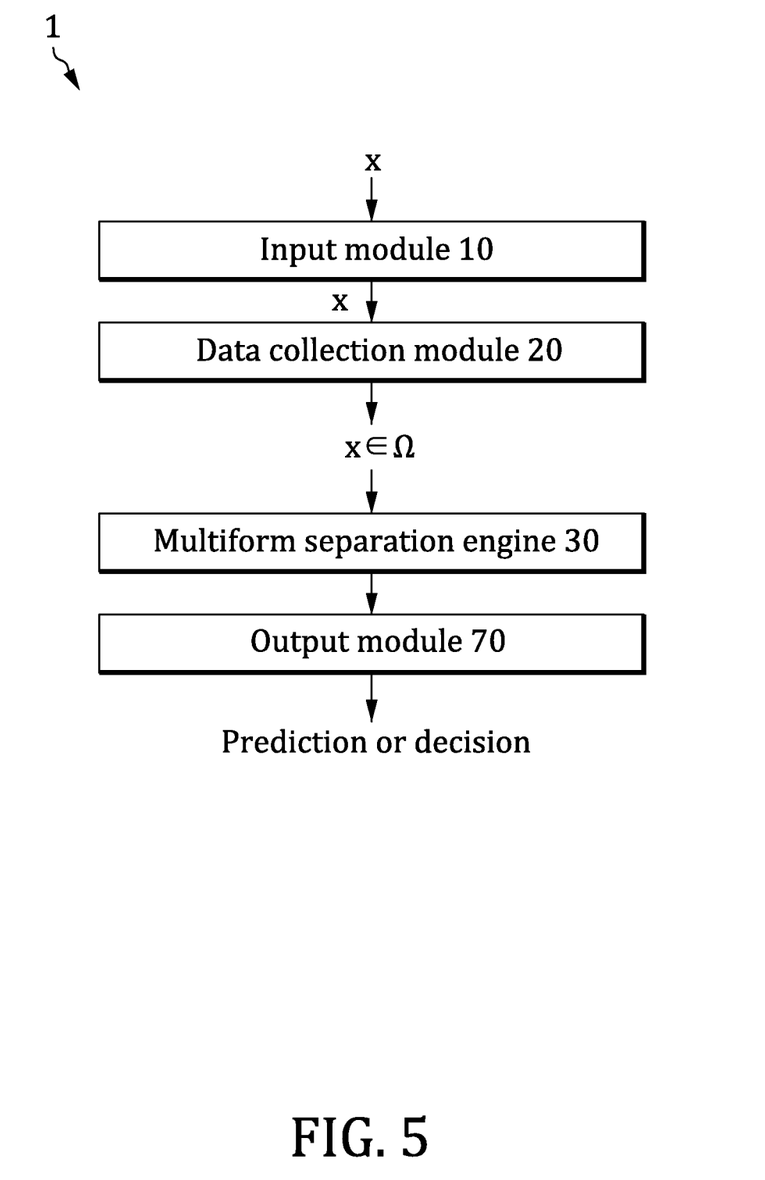
FIG. 5 shows a schematic block diagram of the multiform separation classifier according to one embodiment of the present invention for prediction or decision.

FIG. 5 shows a schematic block diagram of the multiform separation classifier 1 according to one embodiment of the present invention for prediction or decision.

The multiform separation classifier 1 of the present invention can be expressed by the following two equations:

$U(j)=\{x \in \Omega: f_j(x)=\min\{f_1(x), f_2(x), \ldots, f_m(x)\}\}$,
$j=1, \ldots, m$ and $ŷ(x)=j$ if $x \in U(j)$ or equivalently, $ŷ(x)=j$ if $f_j(x) \leq f_k(x), k=1, \ldots,$ In summary, the present invention solves the classification problem as follows: Given any sample data $x \in \Omega$ ($\Omega$ may include the training set $\Omega_{tr}$ and/or the test set $\Omega_{tt}$ and/or the remaining set $\Omega_{th}$), apply the m trained piecewise continuous functions $f_1, \ldots, f_m$ at the sample data x to obtain their respective temporary evaluations. If the temporary evaluation $f_j(x)$ at the sample data x of a certain trained piecewise continuous function $f_j$ is minimal among all temporary evaluations $f_1(x), \ldots, f_m(x)$ at the sample data x of the m trained piecewise continuous functions $f_1, \ldots, f_m$, x is determined to belong to the j-th membership subset U(j), and consequently x is determined to have the membership j.

(Method to Implement a Multiform Separation Classifier)

The respective modules, engines, and the overall structure of the multiform separation classifier 1 of the present invention have been discussed above. However, in the aspect of software, the multiform separation classifier 1 may be alternatively implemented by a sequence of steps, as introduced above. Therefore, the method of the present invention essentially includes the following steps, executed in order:

(a) preparing a training set $\Omega_{tr}$ from a collection of data a Preferably, the training set $\Omega_{tr}$ is further decomposed into training subsets $\Omega_{tr}(j)$, $j=1, \ldots, m$, where the memberships j's refer to data categories of the training set $\Omega_{tr}$ of the classification. This step may be executed by the aforementioned data collection module 20.

(b) constructing a multiform separation engine 30 configured to use m piecewise continuous functions to perform classification, where m≥2. The m piecewise continuous functions are respectively trained with the training set $\Omega_{tr}$ through a learning process. Preferably, each piecewise continuous function is a quadratic function. However, in other embodiments, each piecewise continuous function may be a linear function or a quartic function, or more generally may be a polynomial function, a rational function, an algebraic function, a transcendental function, or any explicitly or implicitly defined suitable function.

(c) deriving an output result after sample data x is processed through the multiform separation engine 30. In particular, the sample data x is classified to have a membership j if a temporary evaluation at the sample data x of a certain trained piecewise continuous function is minimal among all temporary evaluations at the sample data x of the m trained piecewise continuous functions. In particular, the trained m piecewise continuous functions are generated by minimizing a cost function $\Phi$, which provides a performance measure for separating training subsets $n_{tr}(j)$, $j=1, \ldots, m$. This step may be executed by the aforementioned output module 70.

In conclusion, the present invention provides a multiform separation classifier, which appropriate utilizes multiple functions, so as to produce better solutions, in terms of accuracy, robustness, complexity, speed, dependency, cost, and so on.

Although the present invention has been explained in relation to its preferred embodiment, it is to be understood that many other possible modifications and variations can be made without departing from the spirit and scope of the invention as hereinafter claimed.

What is claimed is:

1. A multiform separation classifier implemented as a manufacture, comprising:

an input module configured to receive sample data x;

a data collection module connected to the input module and configured to store a collection of data $\Omega \subset \mathbb{R}^p$ from the input module, the collection of data $\Omega \subset \mathbb{R}^p$ including a training set $\Omega_{tr}$ and a test set $\Omega_{tt}$, wherein the collection of data $\Omega \subset \mathbb{R}^p$ is composed of m memberships or categories of elements, and the m memberships or categories are digitized as 1, 2, . . . , m, m is greater or equal to 2;

a quadratic multiform separation engine connected to the data collection module and configured to use m q-dimensional member functions $f_1, \ldots, f_m$ generated through a learning process based on the training set $\Omega_{tr}$ to perform classification, wherein each q-dimensional member function is defined as a quadratic function f having a form $\|Ax-b\|^2$, for an integer q, a constant matrix $A \in \mathbb{R}^{q \times p}$, and a constant vector $b \in \mathbb{R}^q$, where $\|\cdot\|$ denotes the Euclidean norm, thus m trained q-dimensional member functions $f_1, \ldots, f_m$ have expressions $f_1(x)=\|A_1x-b_1\|^2$, $f_2(x)=\|A_2x-b_2\|^2$, . . . , $f_m(x)=\|A_mx-b_m\|^2$, where trained matrices of constant matrices $A_1, \ldots, A_m$ and trained vectors of constant vectors $b_1, \ldots, b_m$ are solved through the learning process; wherein in the learning process, $m^2$ control parameters $\alpha_{jk}$, j=1, . . . , m, k=1, . . . , m are set between 0 and 1, and each control parameter $\alpha_{jk}$ is used to compare with a ratio $$\frac{f_j(x)}{f_k(x)},$$

j=1, . . . , m, k=1, . . . , m, to yield intermediate functions $$\varphi_{jk}(x) = \max\left\{\alpha_{jk}, \frac{f_j(x)}{f_k(x)}\right\};$$

and an output module connected to the quadratic multiform separation engine and configured to derive an output result after the sample data x is processed through the quadratic multiform separation engine.

2. The multiform separation classifier of claim 1, wherein the sample data x is classified to have a membership j if a temporary evaluation at the sample data x of a certain trained q-dimensional member function is minimal among all temporary evaluations at the sample data x of the m trained q-dimensional member functions.

3. The multiform separation classifier of claim 1, wherein the quadratic multiform separation engine is configured to generate membership subsets U(j)'s based on the m trained q-dimensional member functions.

4. The multiform separation classifier of claim 3, wherein the quadratic multiform separation engine is configured to derive temporary evaluations $f_1(x), \ldots, f_m(x)$ from the m trained q-dimensional member functions $f_1, \ldots, f_m$ for a certain sample data x, and the certain sample data x is assigned to have a membership j by finding out a specific evaluation $f_j(x)$ after processing the temporary evaluations $f_1(x), \ldots, f_m(x)$ according to a specific operator.

5. The multiform separation classifier of claim 4, wherein the specific operator is a minimum operator used to indicate a minimal item of the temporary evaluations $f_1(x), \ldots, f_m(x)$, wherein the minimal item is the specific evaluation $f_j(x)$, if $f_j(x) \leq f_k(x)$, k=1, . . . , m.

6. The multiform separation classifier of claim 1, wherein in the learning process, given the integer q, the $m^2$ control parameters $\alpha_{jk}$, j=1, . . . , m, k=1, . . . , m, and the training set $\Omega_{tr}$, a cost function $\Phi$ is defined depending on constant matrices $A_1, \ldots, A_m$ and constant vectors $b_1, \ldots, b_m$ that define the member functions $f_1, \ldots, f_m$.

7. The multiform separation classifier of claim 6, wherein the cost function $\Phi$ is defined by $$\Phi(f_1, \ldots, f_m) = \sum_{j=1}^{m} \sum_{k \in S, k \neq j} \sum_{x \in \Omega_{tr}(j)} \varphi_{jk}(x).$$

8. The multiform separation classifier of claim 7, wherein the m trained q-dimensional member functions are generated by minimizing the cost function $\Phi$ among $\Theta(q)$, a set of all q-dimensional member functions.

9. The multiform separation classifier of claim 8, wherein the learning process is configured to solve $$\min_{f_1,\ldots,f_m} \Phi(f_1, \ldots, f_m) = \min_{f_1,\ldots,f_m} \sum_{j=1}^{m} \sum_{k \in S, k \neq j} \sum_{x \in \Omega_{tr}(j)} \varphi_{jk}(x)$$

where $S = \{1, 2, \ldots, m\}$ is a set of memberships.

10. The multiform separation classifier of claim 1, wherein the multiform separation classifier is implemented in a cloud server or a local computer as hardware or software or as separated circuit devices on a set of chips or an integrated circuit device on a single chip.

11. A method to implement a multiform separation classifier, comprising following steps:

preparing a training set $\Omega_{tr}$ from a collection of data $\Omega \subset \mathbb{R}^p$ including the training set $\Omega_{tr}$ and a test set $\Omega_{tt}$, wherein the collection of data $\Omega \subset \mathbb{R}^p$ is composed of m memberships or categories of elements, and the m memberships or categories are digitized as 1, 2, . . . , m, m is greater or equal to 2;

configuring a quadratic multiform separation engine to use m q-dimensional member functions $f_1, \ldots, f_m$ generated through a learning process based on the training set $\Omega_{tr}$ to perform classification, wherein each q-dimensional member function is defined as a quadratic function f having a form $\|Ax-b\|^2$, for an integer q, a constant matrix $A \in \mathbb{R}^{q \times p}$, and a constant vector $b \in \mathbb{R}^q$, where $\|\cdot\|$ denotes the Euclidean norm, thus m trained q-dimensional member functions $f_1, \ldots, f_m$ have expressions $f_1(x)=\|A_1x-b_1\|^2$, $f_2(x)=\|A_2x-b_2\|^2$, . . . $f_m(x)=\|A_mx-b_m\|^2$, where trained matrices of constant matrices $A_1, \ldots, A_m$ and trained vectors of constant vectors $b_1, \ldots, b_m$ are solved through the learning process; wherein in the learning process, $m^2$ control parameters $\alpha_{jk}$, j=1, . . . , m, k=1, . . . , m are set between 0 and 1, and each control parameter $\alpha_{jk}$ is used to compare with a ratio $$\frac{f_j(x)}{f_k(x)},$$

j=1, ..., m, k=1, ..., m, to yield intermediate functions $$\varphi_{jk}(x) = \max\left\{\alpha_{jk}, \frac{f_j(x)}{f_k(x)}\right\};$$

and
  deriving an output result after sample data x is processed through the quadratic multiform separation engine.

12. The method of claim 11, further comprising a step of decomposing the training set $\Omega_{tr}$ into training subsets $\Omega_{tr}(j)$, j=1, ..., m, where j's represent memberships of the classification.

13. The method of claim 12, the memberships j's referring to data categories of the training set $\Omega_{tr}$.

14. The method of claim 11, wherein the sample data x is classified to have a membership j if a temporary evaluation at the sample data x of a certain trained q-dimensional member function $f_j(x)$ is minimal among all temporary evaluations at the sample data x of the m trained q-dimensional member functions.

15. The method of claim 11, wherein the trained m q-dimensional member functions are generated by minimizing a cost function $\Phi$, which provides a performance measure for separating training subsets $\Phi_{tr}(j)$, j=1, ..., m.

* * * * *